(12) United States Patent
Shih

(10) Patent No.: US 7,092,678 B2
(45) Date of Patent: Aug. 15, 2006

(54) FRONT END MODULE FOR WIRELESS NETWORK SYSTEM

(75) Inventor: Cheng-yen Shih, Taoyuan (TW)

(73) Assignee: Delta Electronics, Inc., (TW)

( * ) Notice: Subject to any disclaimer, the term of this patent is extended or adjusted under 35 U.S.C. 154(b) by 503 days.

(21) Appl. No.: 10/672,265

(22) Filed: Sep. 25, 2003

(65) Prior Publication Data

US 2005/0032481 A1    Feb. 10, 2005

(30) Foreign Application Priority Data

Aug. 5, 2003    (TW)    ............................... 92121403 A

(51) Int. Cl.
    *H04B 1/44*    (2006.01)
(52) U.S. Cl. ................... 455/78; 455/339; 455/114.3; 455/341; 455/73; 375/222; 375/223
(58) Field of Classification Search ................ 455/78, 455/339, 114.3, 341, 73; 375/222, 223; 370/280
    See application file for complete search history.

(56) References Cited

U.S. PATENT DOCUMENTS

| | | | |
|---|---|---|---|
| 5,787,117 A * | 7/1998 | Ash | 375/223 |
| 6,366,622 B1 * | 4/2002 | Brown et al. | 375/322 |
| 6,477,148 B1 * | 11/2002 | Gardenfors et al. | 370/280 |
| 2003/0078011 A1 * | 4/2003 | Cheng et al. | 455/73 |

* cited by examiner

*Primary Examiner*—Matthew D. Anderson
*Assistant Examiner*—Sanh Phu
(74) *Attorney, Agent, or Firm*—Martine Penilla & Gencarella, LLP

(57) ABSTRACT

A front end module for wireless network system is disclosed. The front end module includes a transmitting/receiving switch, a bandpass filter, a balun, a lowpass filter, and a power amplifier. The front end module is characterized in that the bandpass filter, the balun and the lowpass filter are formed inside a plurality of low-temperature-cofired-ceramic (LTCC) substrates by a patterning process while the transmitting/receiving switch, and the power amplifier are formed on a surface layer of the LTCC substrates by the surface mounting technology (SMT).

15 Claims, 2 Drawing Sheets

US 7,092,678 B2

FRONT END MODULE FOR WIRELESS NETWORK SYSTEM

BACKGROUND OF THE INVENTION

1. Field of the Invention

The present invention relates to a front end module, and more particularly, to a front end module for wireless network system.

2. Description of the Related Art

Up to the present, the technology of wireless network is divided into two categories. One utilizes a radio wave to make a transmission while another one utilizes light to make a transmission. Examples of the latter are the infrared light and laser served as carrier for data transmission. Since a radio wave has better transmittance than light, it is more flexible in application.

With regard to the wireless network utilizing the radio wave, there are two aspects in the development. One is the blue-tooth technology applied for circumstance of short distance (10 meter), low power consuming (100 mW), and low cost while another one is the IEEE802.11 technology applied for the office (data transmission rate is up to 54 Mbps and the distance can be lengthen to be 100 meter around).

In general, a wireless network system based on the IEEE802.11 technology includes a front end module, a base-band processor (defined as PHY), and a media access controller (MAC).

Since an included front end module always comprises a lot of passive components such as capacitors, resistors, filters, and impedance converters, there are problems of low reliability, high cost, and large volume. Therefore, an attempt to modularize and miniaturize these components in order to solve these problems would be raised.

SUMMARY OF THE INVENTION

At the present time, a conventional front end module of the wireless network communication systems excluding mobile phones is criticized for the drawbacks of big volume, high cost, and low reliability. For the needs to modularize and miniaturize those above-mentioned passive components, the present invention provides a front end module for wireless network system that is manufactured by using the low temperature co-fired ceramic (LTCC) technology and therefore involves the benefits of small volume, low cost, and high reliability.

Accordingly, one object of the invention is to provide a front end module for wireless network system that includes a lot of integrated and miniaturized passive components.

The front end module for wireless network system according to one aspect of the invention includes a transmitting/receiving switch, a band-pass filter, a balun, a power amplifier, and a low-pass filter.

The band-pass filter is connected to the transmitting/receiving switch for receiving wanted signals and rejecting undesired signals, and the balun is connected to the band-pass filter for transferring the wanted signals from unbalance to balance.

Also, the power-amplifier is used to raise the power of signals to be transmitted while the low-pass filter is connected to the power amplifier to reject the spurious signals of the signals to be transmitted.

The present invention is characterized in that the band-pass filter, the balun, and the low-pass filter are formed inside a plurality of low temperature co-fired ceramic substrates by a patterning process while the transmitting/receiving switch and the power amplifier are formed on a surface layer of the plurality of low temperature co-fired ceramic substrates by a surface mounting technology.

The present invention has the following advantages. First, the front end module for wireless network system is volume miniaturized, cost lowed, and reliability increased by the above-mentioned LTCC technology and the patterning process. Secondly, the circuitry inside the module has better heat dissipating efficiency than conventional materials such as fiberglass or Teflon. Thirdly, the design and manufacture of the front end module are highly matched, so that the producing time can be reduced.

DETAILED DESCRIPTION OF THE PREFERRED EMBODIMENTS

Thereinafter, the architecture, composition and manufacturing method of the front end module for wireless network system according to the present invention are described by examples.

Figure 1:
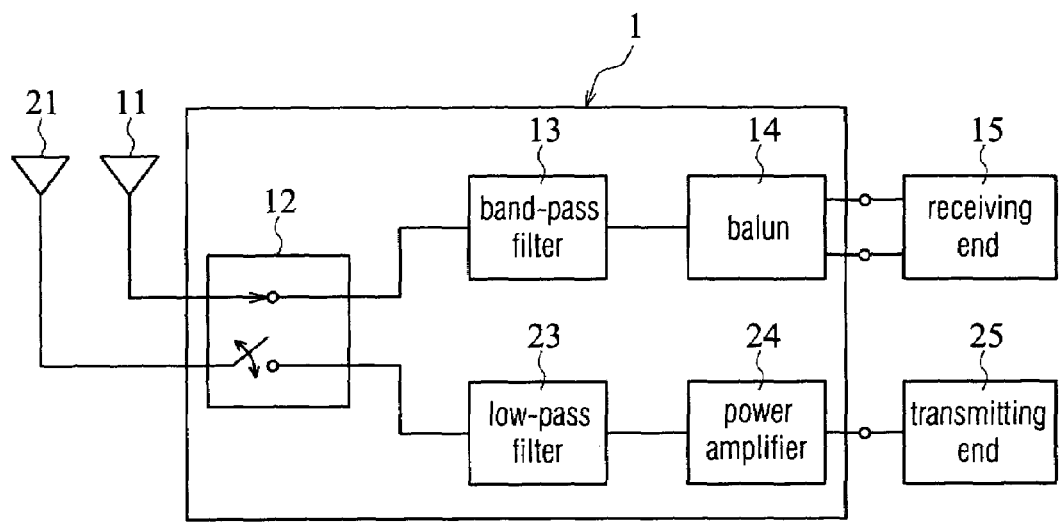
FIG. 1 is a block diagram illustrating the architecture of the front end module for wireless network system according to the present invention.

Referring to FIG. 1, the front end module 1 for wireless network system according to the first embodiment of the invention mainly includes a transmitting/receiving switch 12, a band pass filter 13, a balun 14, a low pass filter 23 and a power amplifier 24.

The front end module 1 is operated to receive a radio frequency signal by a receiving antenna 11, to transmit the radio frequency signal to a receiving end 15, and to transmit a processed signal from a transmitting end 25 by a transmitting antenna 21.

In the period of operation, only the receiving path or the transmitting path can be switched on for the front end module 1. Referring again to FIG. 1, the transmission path is not switched on by the transmitting/receiving switch 12 while a signal transmitting by the receiving end 15 is proceeding. Therefore, the band-pass filter 13 receives wanted radio frequency signals and rejects the undesired signals while the balun 14 transfers the wanted radio frequency signals from unbalance to balance before the signals are received by the receiving end 15.

On the other hand, when the transmitting end 25 is prepared for a signal transmitting, the transmitting/receiving switch 12 acts to switch on the transmitting path. Meanwhile, the power of the signals from the transmitting end 25 is raised by the power amplifier 17, the spurious signals are rejected by the low-pass filter 16, and then the remained authentic signals pass through the transmitting/receiving switch 12 and then be transmitted by the transmitting antenna 21.

In the present embodiment, the transmitting/receiving switch 12 includes a GaAs switch and RC circuits while the band pass filter 13, the balun, and the low pass filter 23 include LC circuits, respectively.

Figure 2:
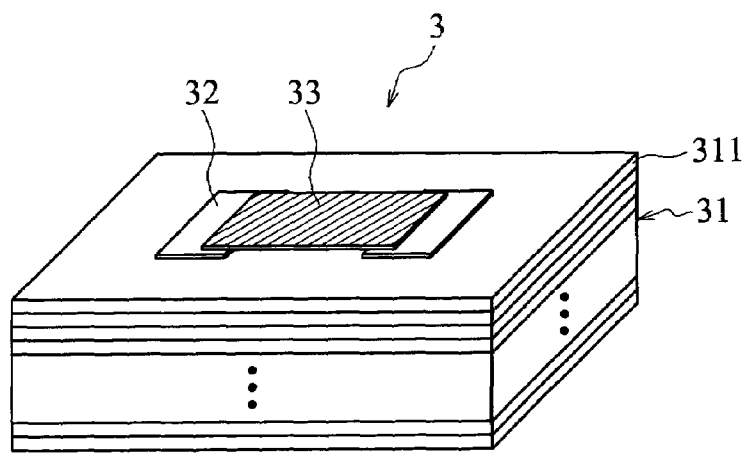
FIG. 2 is a perspective view illustrating the ink printing resistors on the low temperature co-fired ceramic substrates of the front end module for wireless network system according to one embodiment of the invention.

Referring to FIG. 2, the front end module 1 according to the present invention employs multiplayer low temperature co-fired ceramic (LTCC) substrate 31 to form an integrated module 3. Herein, each layer of the LTCC substrate 31 is made of ceramic dielectric materials and consists of many electrically conductive layers.

To be explicit, capacitors of the transmitting/receiving switch 12, the bandpass filter 13, the balun 14 and the lowpass filter 23 are formed inside the layers of the LTCC substrate 31 by a patterning process. Since the above mentioned components are composed of capacitors and inductances, the integration of capacitors of the transmitting/receiving switch 12, the bandpass filter 13, the balun 14 and the lowpass filter 23 inside the layers of the LTCC substrate 31 is the formation of these passive components including capacitors and inductances inside the layers of the LTCC substrate 31. Consequently, inside the layers of the LTCC substrate 31 are those capacitors and inductances. Moreover, on a surface layer 311 of the layers of the LTCC substrate 31 are some active components mounted by surface mounting technology (SMT) such as resistors of the transmitting/receiving switch 12, the amplifier 17, and other semiconductor components, for example, IC chips.

Figure 3A:
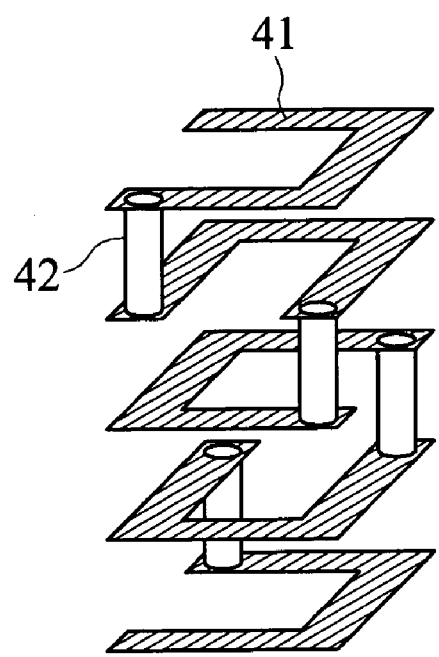
FIG. 3A is a schematic diagram showing the configurations of the inductance of the front end module for wireless network system according to one embodiment of the invention.

As shown in FIG. 3A, those inductances are formed in the electrically conductive layers 41 inside each LTCC substrate 31 to be stripped electrodes after a patterning process. In addition, there are electrically dielectric layers (not shown) between the electrically conductive layers 41, and the electrically conductive layers 41 are connected to each other through via holes 42 formed there-between. Accordingly, the inductances connected inside the layers of the LTCC substrate 31 are performed to be spiral.

Figure 3B:
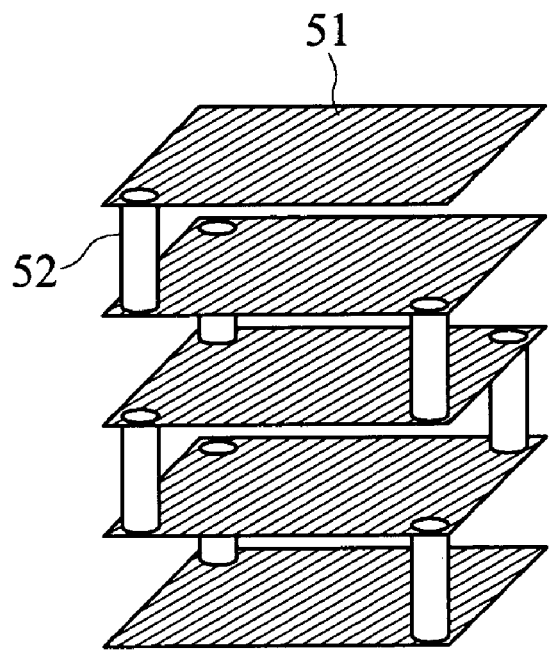
FIG. 3B is a schematic diagram showing the configurations of the capacitors of the front end module for wireless network system according to one embodiment of the invention.

On the other hand, as shown in FIG. 3B, those capacitors are formed on the electrically conductive layers 51 inside the layers of the LTCC substrate 31 to be plate electrodes. In addition, there are electrically dielectric layers (not shown) between the electrically conductive layers 51, and the electrically conductive layers 51 are connected to each other through via holes 52 formed there-between. Therefore, the capacitors connected inside the layers of the LTCC substrate 31 are performed to be overlapping. In other words, those capacitors and inductances are integrated into the multiplayer LTCC substrates 31 by patterning.

As shown in FIG. 2, the resistors are fabricated by thin film technology such as ink printing to form ink 33 with impedance between the surface electrodes 32 on the surface layer of the LTCC substrate 311 according to specific length breadth ratio.

With regard to the surface layer 311 of the LTCC substrate 311, not only the resistors but also the amplifier 17 and other active components made up of semiconductor materials are on the surface. These resistors and active components on the surface layer 311 of the LTCC substrate 311 are connected to the LC circuits under the surface layer 311 through the above-mentioned metallic via holes 42 and 52.

Owing to the high dielectricity of the ceramic substrates, the front end module 1 for wireless network according to the present invention can utilize the patterning process to embed a lot of passive components into the ceramic substrates to form an integration without interference, and thereby effectively reduces the volume originally occupied by these passive components.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A front end module for wireless network system comprising:
    a transmitting/receiving switch;
    a band-pass filter connected to the transmitting/receiving switch for receiving wanted signals and rejecting undesired signals;
    a balun connected to the band-pass filter for transferring the wanted signals from unbalance to balance;
    a power amplifier for raising the power of signals to be transmitted; and
    a low-pass filter connected to the power amplifier for rejecting the spurious signals of the signals to be transmitted;
    wherein the band-pass filter, the balun, and the low-pass filter lie inside a plurality of low temperature co-fired ceramic substrates while the transmitting/receiving switch and the power amplifier lie on a surface layer of the plurality of low temperature co-fired ceramic substrates.

2. The front end module for wireless network system of claim 1, wherein the band-pass filter, the balun, and the low-pass filter are formed by a patterning process.

3. The front end module for wireless network system of claim 1, wherein the transmitting/receiving switch and the power amplifier are formed by a surface mounting technology (SMT).

4. The front end module for wireless network system of claim 1, wherein there are a plurality of electrically conductive layers and a plurality of dielectric layers inside the low temperature co-fired ceramic substrates and there are metallic via holes formed between the electrically conductive layers.

5. The front end module for wireless network system of claim 4, wherein at least a GaAs switch and a RC circuit are included in the transmitting/receiving switch while at least an LC circuit is included in the band-pass filter, the balun, and the low-pass filter.

6. The front end module for wireless network system of claim 5, wherein capacitors and inductances of the RC circuit and LC circuit are formed in the electrically conductive layers by patterning.

7. The front end module for wireless network system of claim 6, wherein the capacitors formed in the electrically conductive layers are performed to be overlapping and the inductances formed in the electrically conductive layers are performed to be spiral.

8. The front end module for wireless network system of claim 5, wherein there are two surface electrodes formed on the surface layer, and resistors of the RC circuit are formed between the surface electrodes.

9. The front end module for wireless network system of claim 8, wherein the resistors of the RC circuit are formed by an ink-printing process.

10. The front end module for wireless network system of claim 8, wherein the resistors of the RC circuit are formed on ink thin-film with impendence.

11. The front end module for wireless network system of claim 8, wherein the RC circuit and the LC circuit are connected to the surface electrodes through the metallic via holes formed between the electrically conductive layers.

12. The front end module for wireless network system of claim 5, wherein there are a plurality active components formed on the surface layer.

13. The front end module for wireless network system of claim 12, wherein the RC circuit and the LC circuit are connected to the active components through the metallic via holes formed between the electrically conductive layers.

14. The front end module for wireless network system of claim 1, wherein a receiving antenna connects with the transmitting/receiving switch for receiving the wanted signals and a transmitting antenna connects with the transmitting/receiving switch for transmitting the signals to be transmitted excluding the spurious signals.

15. The front end module for wireless network system of claim 1, wherein the balun is further connected to a receiving end and the power amplifier is further connected to a transmitting end.

* * * * *